United States Patent
Itou

(10) Patent No.: US 9,314,736 B2
(45) Date of Patent: Apr. 19, 2016

(54) SEPARATION COMPOSITE MEMBRANE AND SEPARATING MEMBRANE MODULE USING THE SAME

(71) Applicant: FUJIFILM CORPORATION, Minato-ku, Tokyo (JP)

(72) Inventor: Shigehide Itou, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/457,200

(22) Filed: Aug. 12, 2014

(65) Prior Publication Data

US 2014/0345462 A1 Nov. 27, 2014

Related U.S. Application Data

(63) Continuation of application No. PCT/JP2013/053546, filed on Feb. 14, 2013.

(30) Foreign Application Priority Data

Feb. 16, 2012 (JP) .................................. 2012-032090

(51) Int. Cl.
*B01D 53/22* (2006.01)
*B01D 69/02* (2006.01)
(Continued)

(52) U.S. Cl.
CPC .............. *B01D 53/228* (2013.01); *B01D 69/02* (2013.01); *B01D 69/10* (2013.01); *B01D 69/12* (2013.01);
(Continued)

(58) Field of Classification Search
CPC ...... B01D 53/22; B01D 53/228; B01D 69/12; B01D 2256/16; B01D 2256/245; B01D 2257/304; B01D 2257/504; B01D 2258/0233; B01D 2258/025; B01D 2258/0283; B01D 2258/05; B01D 2325/02; B01D 2325/022; B01D 2323/30; B01D 2325/24; B01D 69/02; B01D 69/10; C10L 3/101; C10L 3/104; C10L 3/105; Y02C 10/10

See application file for complete search history.

(56) References Cited

U.S. PATENT DOCUMENTS 4,527,999 A * 7/1985 Lee ................................ 210/654
4,806,189 A * 2/1989 Kraus et al. ................... 156/155
(Continued)

FOREIGN PATENT DOCUMENTS

JP 56-89803 A 7/1981
JP 58-95539 A 6/1983
(Continued)

OTHER PUBLICATIONS

George Q. Chen, et al., "Water vapor permeation in polyimide membranes", Journal of Membrane Science, 2011, pp. 479-487, vol. 379.
(Continued)

*Primary Examiner* — Anthony Shumate
(74) *Attorney, Agent, or Firm* — Sughrue Mion, PLLC

(57) ABSTRACT

A separation composite membrane including: a separating layer for separating fluid components, the separating layer being constituted of a polymer having cross-linked structure, and a porous layer for supporting the separating layer, the porous layer having a maximum pore diameter of 0.05 to 0.5 µm, the separating layer being partly impregnated into the porous layer in the range of 0.1 to 30% in terms of the impregnation amount ratio ($\eta a$) defined by Formula (A):

[impregnation amount ratio ($\eta a$){%}=impregnation depth ($s$)/(membrane thickness ($t_1$) of separating layer)×100]   (A).

7 Claims, 1 Drawing Sheet

(51) Int. Cl.
*B01D 69/10* (2006.01)
*B01D 69/12* (2006.01)
*C10L 3/10* (2006.01)

(52) U.S. Cl.
CPC .............. *C10L 3/101* (2013.01); *C10L 3/104* (2013.01); *C10L 3/105* (2013.01); *B01D 53/22* (2013.01); *B01D 2256/16* (2013.01); *B01D 2256/245* (2013.01); *B01D 2257/304* (2013.01); *B01D 2257/504* (2013.01); *B01D 2258/025* (2013.01); *B01D 2258/0233* (2013.01); *B01D 2258/0283* (2013.01); *B01D 2258/05* (2013.01); *B01D 2323/30* (2013.01); *B01D 2325/02* (2013.01); *B01D 2325/022* (2013.01); *B01D 2325/24* (2013.01); *Y02C 10/10* (2013.01)

(56) References Cited

U.S. PATENT DOCUMENTS

| | | | |
|---|---|---|---|
| 4,950,314 A | 8/1990 | Yamada et al. | |
| 5,167,825 A * | 12/1992 | Lipski et al. | 210/640 |
| 7,749,305 B1 * | 7/2010 | Bossard et al. | 95/55 |
| 8,052,775 B2 * | 11/2011 | Hou et al. | 95/43 |
| 8,133,308 B2 * | 3/2012 | Lively et al. | 96/154 |
| 8,834,612 B2 * | 9/2014 | Hoshino et al. | 96/11 |
| 8,900,351 B2 * | 12/2014 | Mori et al. | 96/11 |
| 8,926,732 B2 * | 1/2015 | Bara | B01D 53/228 252/364 |
| 2003/0134550 A1 | 7/2003 | Lee et al. | |
| 2003/0150808 A1 | 8/2003 | Morikawa et al. | |
| 2004/0023029 A1 * | 2/2004 | Nakao et al. | 428/402 |
| 2005/0118479 A1 * | 6/2005 | Yamaguchi | B01D 67/0009 429/413 |
| 2005/0269257 A1 * | 12/2005 | Voute et al. | 210/502.1 |
| 2010/0269464 A1 * | 10/2010 | Mori et al. | 55/486 |
| 2014/0260986 A1 * | 9/2014 | Ishizuka et al. | 96/13 |
| 2015/0245470 A1 * | 8/2015 | Su | H05K 1/0271 174/251 |

FOREIGN PATENT DOCUMENTS

| | | |
|---|---|---|
| JP | 60-172309 A | 9/1985 |
| JP | 60-257806 A | 12/1985 |
| JP | 61-107921 A | 5/1986 |
| JP | 1-111420 A | 4/1989 |
| JP | 1-242106 A | 9/1989 |
| JP | 6-269649 A | 9/1994 |
| JP | 2003-225542 A | 8/2003 |
| JP | 2010-221218 A | 10/2010 |
| JP | 2011-161387 A | 8/2011 |
| WO | 2007/125944 A1 | 11/2007 |

OTHER PUBLICATIONS

Sergey Shishatskiy, et al., "Comparison of asymmetric and thin-film composite membranes having Matrimid 5218 selective layer", Desalination, 2006, pp. 193-194, vol. 199.

P.S. Tin, et al., "Effects of cross-linking modification on gas separation performance of Matrimid membranes", Journal of Membrane Science, 2003, pp. 77-90, vol. 225.

Hong-Yong Zhao, et al., "Poly(ethylene oxide) induced cross-linking modification of Matrimid membranes for selective separation of CO2", Journal of Membrane Science, 2008, pp. 179-184, vol. 320.

International Search Report of PCT/JP2013/053546, dated May 14, 2013. [PCT/ISA/210], 5 pgs.

Communication dated Jul. 7, 2015 from the Japanese Patent Office in counterpart application No. 2012-032090.

Office Action (Decision on Refusal) issued Mar. 1, 2016 for corresponding Japanese Patent Application No. 2012-032090, 6 pgs.

* cited by examiner

SEPARATION COMPOSITE MEMBRANE AND SEPARATING MEMBRANE MODULE USING THE SAME

CROSS-REFERENCE TO RELATED APPLICATIONS

This application is a Continuation of PCT International Application No. PCT/JP2013/053546 filed on Feb. 14, 2013, which claims priority under 35 U.S.C. §119 (a) to Japanese Patent Application No. 2012-032090 filed on Feb. 16, 2012. Each of the above applications is hereby expressly incorporated by reference, in its entirety, into the present application.

TECHNICAL FIELD

The present invention relates to a separation composite membrane and a separating membrane module using the same.

BACKGROUND ART

There is a separation membrane, made of a specific polymer compound, which performs in selective permeation and separation of a desired gas component. As a specific industrial application, the membrane has been utilized in a separation process for eliminating carbon dioxide or the like from a natural gas or bio gas mainly formed of methane and carbon dioxide in the mixture (such gases are generated by fermentation and anaerobic digestion of excreta of organisms, organic fertilizers, biodegradable substances, polluted water, garbages, energy crops or the like). Besides, study has been conducted, in relation to a global warming issue, for separating and recovering carbon dioxide from a large-scale carbon dioxide source such as in a thermal power station, a cement plant, a blast furnace in a steel plant. As such, the membrane separation technique attracts attention as a solution to the above environmental issues, achievable with relatively small energy (see Patent Literature 1, Patent Literature 2 or the like).

Various types of the gas separation membrane have been proposed. One of which includes a separation composite membrane formed of a separation membrane and a porous support in combination. Patent Literature 1 discloses a separation composite membrane containing cross-linked polymer, employed with a porous membrane having a cutoff molecular weight of 500,000 or less (mean pore diameter: 50 nm or less). As disclosed, the separation membrane may perform excellently in bending properties and diminishing pinholes. Patent Literature 2 discloses a separation membrane formed in the manner that a porous membrane having a pore diameter as large as about 1 μm is impregnated into a mixed liquid of a siloxane compound. The art may purportedly achieve a high separation factor and a high permeability coefficient. Further, Patent Literature 3 discloses a separation membrane formed of a fluorocarbon resin provided onto a biaxially oriented polyethylene film. In the literature, this fluorocarbon resin separation membrane is described to preferably exist wholly over a surface and an inside of a porous layer. Consequently, it is concluded that the membrane may attain excellent gas permeation and gas separation properties in separation of oxygen and nitrogen.

CITATION LIST

Patent Literatures

Patent Literature 1: JP-A-2011-161387 ("JP-A" means unexamined published Japanese patent application)
Patent Literature 2: JP-A-6-269649
Patent Literature 3: WO 2007/125944 A

SUMMARY OF THE INVENTION

Technical Problem

The present inventors analyzed and pursued technical aspects as to a separation composite membrane having a separating layer laminated on the support of a porous layer. They eventually reach the fact, particularly in the separation composite membrane, when adhesion is insufficient between individual layers, in that a defect may occur due to membrane peeling, and it would cause failure of showing the desired performance. Accordingly, the present inventors undertook research and development, rather for the purpose of improving the inter-layer adhesion and the durability, with maintaining separation performance for a gas or the like. A finding therefrom brought a significant improvement in the adhesion, not by merely selecting a material of the porous layer or the separating layer, but instead by forming structure in which a part of a separating layer is impregnated into pores of the support upon forming the separating layer on the porous support.

The present invention thus addresses to the provision of a separation composite membrane that can realize excellent fluid permeability and separation selectivity, and further can achieve high adhesion between layers of the composite membrane and high durability. Further, the present invention addresses to the provision of a separating membrane module using the same.

Solution to Problem

The problems of the present invention can be solved by the following means.

[1] A separation composite membrane comprising:
a separating layer for separating fluid components, the separating layer being constituted of a polymer having cross-linked structure, and
a porous layer for supporting the separating layer, the porous layer having a maximum pore diameter of 0.05 to 0.5 μm,
the separating layer being partly impregnated into the porous layer in the range of 0.1 to 30% in terms of the impregnation amount ratio ($\eta a$) defined by Formula (A):

$$[\text{impregnation amount ratio } (\eta a)\{\%\} = \text{impregnation depth } (s)/(\text{membrane thickness } (t_1) \text{ of separating layer}) \times 100] \quad (A).$$

[2] The separation composite membrane as described in item [1], wherein the separating layer is defined in a polymer membrane having a cross-linked structure with a loss modulus in the range of 1 to 1,000 MPa.
[3] The separation composite membrane as described in item [1], wherein a water contact angle on a surface of the porous layer on a side of the separating layer is 35 degrees or more.
[4] The separation composite membrane as described in item [1], wherein the separating layer comprises at least a resin selected from the group consisting of a polyimide resin, a polyamide resin, a polysiloxane resin, a cellulose resin, a polyethylene oxide resin, a polyvinylalcohol resin, a polyethyleneimine resin, a sodium polyacrylate resin, a polyvinyl pyrrolidone resin and a copolymer resin thereof.
[5] The separation composite membrane as described in item [1], wherein the porous layer comprises at least a resin selected from the group consisting of a polyacrylonitrile resin, a polysulfone resin, a cellulose resin, a fluorocarbon resin, a polyether sulfone resin, a polyamide resin and a polyolefin resin.

[6] The separation composite membrane as described in item [1], wherein an impregnation amount ratio ($\eta b$) determined from the impregnation depth (s) and a membrane thickness ($t_2$) of the porous layer according to Formula (B) is in the range of 0.01 to 20%:

[impregnation amount ratio ($\eta b$){%}=impregnation depth (s)/(membrane thickness ($t_2$) of the porous layer)×100] (B).

[7] The separation composite membrane as described in item [1], wherein an impregnation amount ratio ($\eta c$) determined from the impregnation depth (s) and a total thickness (D) of the separating layer according to Formula (C) is in the range of 0.01 to 20%:

[impregnation amount ratio ($\eta c$){%}=impregnation depth (s)/(total thickness (D) of the separating layer)×100] (C).

[8] A separating membrane module, having the separation composite membrane as described in item [1].

[9] A fluid separation system, comprising the separating module as described in item [8].

Advantageous Effects of Invention

A separation composite membrane and a separating module using the same according to the present invention can realize excellent fluid permeability and excellent separation selectivity, and further can achieve high adhesion between layers of a composite membrane and high durability.

Other and further features and advantages of the invention will appear more fully from the following description, appropriately referring to the accompanying drawings.

MODE FOR CARRYING OUT THE INVENTION

A separation composite membrane according to the present invention is formed of a polymer separating layer having cross-linked structure for separating fluid components, and a porous layer for supporting the same. The porous layer has a micropore having a specific pore diameter, and the membrane has structure in which a part of the separating layer is impregnated into the porous layer at a specific ratio. Hereinafter, the present invention is described in detail focusing on a preferred embodiment with referring to a drawing.

[Constitution of Composite Membrane]

Figure 1:
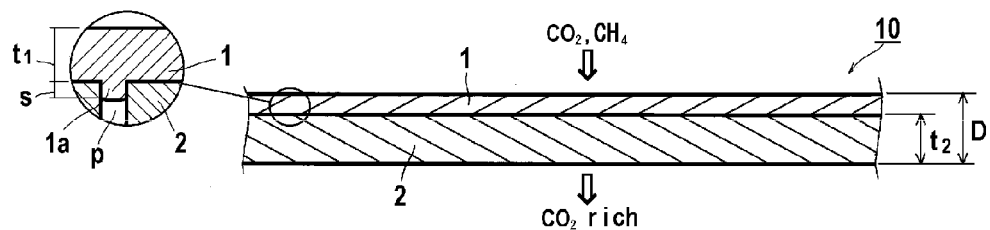
FIG. 1 is a cross section schematically illustrating an embodiment of a separation composite membrane according to the present invention.
Figure 2:
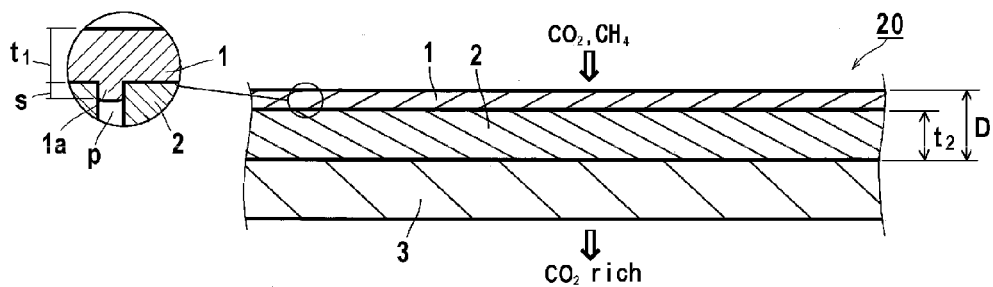
FIG. 2 is a cross section schematically illustrating another embodiment of a separation composite membrane according to the present invention.

FIG. 1 is a cross-sectional view schematically showing a gas separation composite membrane 10, which is a preferred embodiment according to the present invention. The reference sign 1 is a gas separating layer and the reference sign 2 is a supporting layer constituted of a porous layer. FIG. 2 is a cross-sectional view schematically showing a gas separation composite membrane 20, which is a preferred embodiment according to the present invention. According to this embodiment, in addition to the gas separating layer 1 and the porous layer 2, a nonwoven fabric layer 3 is added as a supporting layer. In the composite membrane in such a form, a coating liquid (dope) forming the above-described gas separating layer is preferably coated at least on a surface of a porous support layer (in the specification, the term "coating" means inclusion of an embodiment in which the liquid is deposited on the surface by dipping), and the resultant coat is preferably hardened by an arbitrary method. Herein, an expression "over the supporting layer" means that any other layer may be interposed between the supporting layer and the gas separating layer. In addition, unless otherwise noted, with regard to expressions "over" and "under", a direction in which a gas to be separated is supplied is referred to as "over", and a direction from which a separated gas is discharged is referred to as "under".

The separation composite membranes 10 and 20 according to the present embodiment have structure in the form in which a part of resin in the separating layer 1 enters and impregnates into micropores p in the porous layer 2 in a lower layer. FIGS. 1 and 2 show this impregnated portion as 1a. However, this is schematically shown in consideration of convenience of understanding, and the present invention is not interpreted with limitations to ones having such morphological features.

In the present embodiment, the impregnated portion 1a serves as an anchor (scaffold) to secure adhesion of the resin layer 1 to the porous layer 2. Thus, local cracks or pinholes caused particularly when high pressure (for example, 10 to 150 atom [about 8 to 15 MPa]) is applied are significantly effectively suppressed and prevented. When the separation membrane is plasticized, the effect becomes particularly remarkable and an effect for improving a membrane life is exhibited. On the other hand, permeability of the separation membrane is not excessively decreased by adjusting a ratio of a membrane thickness in an impregnated part to a membrane thickness in a surface part is adjusted in a specific range. As a result, satisfaction of both high gas separation performance and durability is understood to be achieved.

At this time, not only the structure is formed in which the resin is impregnated thereinto, but also the resin in the separating layer 1 including the impregnated portion 1a is cross-linked. Therefore, the membrane is understood to maintain good permeability and separation selectivity and to realize high adhesion and durability when the resin has a fixed loss modulus, thereby suppressing further infiltration thereinto even under high pressure. In this regard, stress is not uniformly applied to the porous membrane structurally, and therefore the membrane ordinarily easily breaks under high pressure or high temperature. At the same time, if the separation membrane in the upper layer is excessively impregnated thereinto, porous structure is thought to be occasionally destroyed under influence of temperature or pressure due to a difference in mechanical physical properties (elongation, brittleness or the like) from the properties of the porous membrane, resulting in drop of durability in the form of the membrane. The present invention allows effective suppression of the above.

[Porous Layer]
(Pore Diameter)

In the present invention, a pore diameter of the membrane constituting the porous layer is set to 0.05 µm or more, as a maximum pore diameter, and is more preferably, 0.07 µm or more, and particularly preferably, 0.12 µm or more. The pore diameter is adjusted to this lower limit or more, thereby allowing sufficient securement of an impregnation amount ratio of a constitutive resin in the separating layer as described later, and such a case is preferred. On the other hand, an upper limit is set to 0.5 µm or less, and is preferably 0.2 µm or less, more preferably, 0.18 µm or less, and particularly preferably, 0.15 µm or less. The pore diameter is adjusted to this upper limit or less, thereby allowing adjustment of the impregnation amount ratio of the constitutive resin in the separating layer to a proper range in a similar manner to the above, and such a case is preferred. A method for measuring the pore diameter is to be based on a method employed in Examples as described later. Other details on a material in the porous membrane or the like will be described later. In addition, the pore diameter can be controlled by adjusting conditions such as resin solution viscosity, resin solution temperature, a solvent composition, a kind of solidification liquid, solidification liquid temperature, a kind of cleaning solution, cleaning solution temperature and drying temperature.

The thickness of the porous layer 2 is preferably from 1 to 3000 µm, more preferably from 5 to 500 µm, particularly preferably from 5 to 300 µm. The porosity is preferably from 5 to 80%, more preferably from 10 to 70%. In addition, the gas permeability is preferably $3\times10^{-5}$ cm$^3$ (STP)/cm·sec·cmHg or more, based on carbon dioxide permeation rate.

(Impregnation Amount Ratio)

The separation composite membrane according to the present invention has structure in which a part of the separating layer is impregnated into the porous layer in the range of 0.1 to 30% in terms of the impregnation amount ratio ($\eta a$) defined by Formula (A).

[impregnation amount ratio ($\eta a$){%}=impregnation depth ($s$)/(membrane thickness ($t_1$) of separating layer)×100]   (A).

The lower limit of the impregnation amount ratio ($\eta a$) is 0.1%, preferably 1% or more, more preferably 3% or more, particularly preferably 5% or more. The impregnation amount ratio ($\eta a$) is adjusted to the lower limit or more, thereby allowing securement of high adhesion as described above, and such a case is preferred. The upper limit thereof is 30%, more preferably 25% or less, particularly preferably 20% or less. The impregnation amount ratio ($\eta a$) is adjusted to the upper limit or less, thereby allowing securement of sufficient fluid permeability, and such a case is preferred.

As a form of impregnation of the resin into the above-described separating layer, an impregnation amount ratio ($\eta b$) is also preferably in the range of 0.01 to 20%.

[impregnation amount ratio ($\eta b$){%}=impregnation depth ($s$)/(membrane thickness ($t_2$) of the porous layer)×100]   (B).

The impregnation amount ratio ($\eta b$) is more preferably 0.05% or more, particularly preferably 0.1% or more. The upper limit thereof is more preferably 15% or less, further preferably 10% or less, still further preferably 3% or less, still more further preferably 1% or less, particularly preferably 0.5% or less.

As a form of impregnation of the resin into the above-described separating layer, an impregnation amount ratio ($\eta c$) is also preferably in the range of 0.01 to 20%.

[impregnation amount ratio ($\eta c$){%}=impregnation depth ($s$)/(total thickness ($D$) of the separating layer)×100]   (C).

The impregnation amount ratio ($\eta c$) is more preferably 0.05% or more, particularly preferably 0.1% or more. The upper limit thereof is more preferably 15% or less, further preferably 10% or less, still further preferably 3% or less, still more further preferably 1% or less, particularly preferably 0.5% or less.

(Loss Modulus)

A loss modulus ($\epsilon''$) of the membrane constituting the porous layer is preferably 1 to 1,000 MPa, and particularly preferably, 10 to 500 MPa. If the loss modulus is too small, the membrane depressed by high pressure easily deforms, resulting in being pushed (impregnated) into the porous layer to cause a decrease in permeability. Moreover, if the loss modulus is too high, when the membrane is depressed by pressure or the like, the membrane becomes easily peelable from the porous layer. When high performance is required, the loss modulus is particularly preferably less than 100 MPa.

[Water Contact Angle]

A water contact angle on the surface of the porous layer on a side of the separating layer according to the present invention is preferably 35° or more, and particularly preferably, 60° or more. If the water contact angle is small, when water vapor is contained in a mixed gas, the membrane depressed by high pressure is impregnated into a porous base material, and permeability easily decreases. The water contact angle has no upper limit, but is practically 150° or less.

[Separating Layer]

A separating layer is not particularly limited, but a general gas separation membrane can be selected. For example, a $CO_2$ separation membrane such as a dissolution diffusion membrane and a facilitated transport membrane can be selected as presented in "Kitaibunrimaku, Tokamaku, Barrier maku no Saishingijyutsu (Latest technologies on gas separation membrane, permeable membrane and barrier membrane) (CMC Publication)," "$CO_2$ Koteika, Kakurigijyutsu ($CO_2$ immobilization and isolation technologies (CMC publication)" or the like.

(Construction Material)

In the separation composite membrane according to the present invention, the main body of separating layer preferably contains a resin, and specific examples of a material applied to this resin include the following materials, but the resin is not necessarily limited thereto. Specifically, the main body thereof is preferably constituted of at least a resin selected from the group consisting of a polyimide resin, a polyamide resin, a polysiloxane resin, a cellulose resin, a polyethylene oxide resin, a polyvinylalcohol resin, a polyethyleneimine resin, a sodium polyacrylate resin and a polyvinyl pyrrolidone resin, and a copolymer resin in combination of constitutional units of the resins.

More specifically, such resin can be selected as Matrimid sold under the trademark of Matrimid (registered trademark) by Huntsman Advanced Materials LLC (Matrimid (registered trademark) 5218 refers to a specific polyimide polymer sold under the trademark of Matrimid (registered trademark)), polyimides such as P84 or P84HT sold under trade name P84 and trade name P84HT by HP Polymers GmbH, respectively, celluloses such as cellulose acetate, cellulose triacetate, cellulose acetate butyrate, cellulose propionate, ethylcellulose, methyl cellulose and nitrocellulose, polydimethylsiloxanes, polyethylene glycols such as a polymer obtained by polymerizing polyethylene glycol #200 diacrylate (manufactured by SHIN-NAKAMURA CHEMICAL CO., LTD.), and a polymer described in JP-T-2010-513021.

The molecular weight of the resin for forming the main body of separating layer is not particularly limited, but the molecular weight is preferably, as a weight average molecular weight, $1.0\times10^4$ to $1.0\times10^7$, and more preferably $1.0\times10^4$ to $5.0\times10^6$. When this molecular weight is adjusted to a value higher than or equal to the lower limit, defects due to cis sing or the like can be reduced, and the performance can be stabilized, which is preferable. On the other hand, when the molecular weight is adjusted to a value lower than or equal to the upper limit, the hydrophilic polymer can be easily dissolved in a solvent at the time of liquid preparation, and production suitability can be enhanced, which is preferable.

Unless it is explicitly stated otherwise, the molecular weight and the degree of dispersion are defined as the values obtained by measurement in accordance with a GPC (Gel Permeation Chromatography). The molecular weight is defined as polystyrene-converted mass-average molecular weight. The gel charged into the column used in the GPC method is preferably a gel having an aromatic compound as a repeating unit, and examples thereof include a gel made of styrene-divinylbenzene copolymers. The column is preferably used in the form where 2 to 6 columns are connected. Examples of a solvent used include ether-based solvents such as tetrahydrofuran, amide-based solvents such as N-methylpyrrolidinone, halogen-based solvents such as chloroform, and aromatic solvent such as 1,2-dichlorobenzene. The measurement is preferably carried out at a flow rate of the solvent in the range of from 0.1 to 2 mL/min, and most preferably in the range of from 0.5 to 1.5 mL/min. By carrying out the measurement within these ranges, there is no occurrence of loading in an apparatus, and thus, the measurement can be carried out further efficiently. The measurement temperature is preferably carried out at from 10° C. to 50° C., and most preferably from 20° C. to 40° C. Measurement can also be carried out at 50° C. to 200° C. using a column having a high usable temperature. A column and a carrier to be used can be properly selected, according to the property of a polymer compound to be measured.

The thickness of the separating layer is not particularly limited, but preferably from 0.01 to 500 μm, more preferably from 0.05 to 100 μm, particularly preferably from 0.1 to 10 μm.

(Cross-Linking of Resin)

Cross-linking allows control of the loss modulus of the resin membrane. In the present invention, cross-linking of the resin constituting the separating layer is important. A cross-linking method is not particularly limited, but a general method can be employed. Specifically, crosslinked structure can be formed by diamine in use of a polyimde resin, diisocyanate in use of a cellulosic resin, aldehyde in use of polyvinyl alcohol, and dicarboxylic acid or diepoxy in use of a polyethyleneimine. Moreover, the resin may be a copolymer having a cross-linking group in a side chain. Specific examples of the cross-linking group in the above case include an acrylate, a methacrylate, an epoxy and an isocyanate. The purpose is to improve the loss modulus for suppressing impregnation, and therefore cross-linking may be made only on a surface on a porous side of the resin membrane by any method. A method therefor is considered in which a resin membrane is formed on a porous base material surface, and then a cross-linking agent is introduced thereinto from a side of the porous base material and brought into contact with a surface on a porous side of the resin membrane to cause a cross-linking reaction.

[Supporting Layer]

The porous support preferably applied for the supporting layer is not particularly limited so long as it satisfies the provision of mechanical strength and high gas permeability, and it may be a porous membrane made of any organic or inorganic substance and is preferably an organic polymer porous membrane. Examples of the material for the porous membrane include conventionally known polymers, including polyolefin-based resins such as polyethylene and polypropylene; fluorine-containing resins such as polytetrafluoroethylene, polyvinyl fluoride, and polyvinylidene fluoride; and various resins such as polystyrene, cellulose acetate, polyurethane, polyacrylonitrile, polyphenyleneoxide, polysulfone, polyethersulfone, polyimide and polyaramide. Among them, from viewpoints of simultaneously attaining high membrane strength, high gas permeability, and separation selectivity, the supporting layer is preferably formed of polyacrylonitrile, polysulfone, or polyphenylene oxide. The shape of the porous membrane may be any of plate, spiral, tubular, or hollow fibers.

As mentioned above, this supporting layer being a thin and porous raw material is preferred due to capability of securing sufficient gas permeability.

In the present invention, in order to further provide the membrane with mechanical strength, a support is desirably formed in a lower part of the supporting layer for forming the gas separating layer. Specific examples of such a support include a woven fabric, a nonwoven fabric, and a net, and a nonwoven fabric is preferably used in view of membrane-forming properties and cost. As the nonwoven fabric, fibers formed of polyester, polypropylene, polyacrylonitrile, polyethylene, polyamide, or the like may be used alone or in combination with a plurality of fibers. The nonwoven fabric can be produced, for example, by paper making of main fibers and binder fibers that are uniformly dispersed in water, using a cylinder mold, a fourdrinier or the like, and drying the resultant product by a drier. Moreover, the nonwoven fabric is preferably interposed between two rolls and subjected to pressure heating processing for the purpose of removing fluff or improving mechanical properties.

[Method for Producing of a Separation Composite Membrane]

The separation composite membrane according to the present invention is preferably produced by a production method including a step for arranging a porous layer, a step for preparing a solution of a resin for constituting the separating layer, and a step for applying the solution to the porous layer.

(Solution of Resin into Separating Layer)

Solvent

The solvent that dissolves the resin constituting the separating layer is not particularly limited, but examples include the following:

(1) esters, for example, ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, 3-oxypropionic acid alkyl esters such as methyl 3-oxypropionate and ethyl 3-oxypropionate; methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate;

(2) ethers, for example, diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, and propylene glycol methyl ether acetate; and (3) ketones, for example, methyl ethyl ketone, methyl isobutyl ketone, cyclohexanone, cyclohexanol, 2-heptanone, and 3-heptanone; and aromatic hydrocarbons, for example, toluene and xylene.

Concentration

The concentration of incorporating the resin constituting the separating layer is not particularly limited, but the concentration is more preferably 0.5% by mass or more, further preferably 0.75% by mass or more, and particularly preferably 1.0% by mass or more. The upper limit is not particularly limited, but is preferably 30% by mass or less, more preferably 25% by mass or less, and particularly preferably 20% by mass or less. When this concentration is adjusted to a value more than or equal to the lower limit, film forming can be achieved without having the resin excessively infiltrated into the support, and thus it is preferable. On the other hand, when the concentration is adjusted to a value less than or equal to the upper limit, the liquid viscosity does not increase excessively, and film forming can be achieved while maintaining the coating suitability, which is preferable. Meanwhile, according to the present invention, two or more kinds of the specific monomer described above may be used in combination as long as the effect of the present invention is not impaired, and other additives and the like may also be used.

A viscosity of a coating liquid is not particularly limited, but one having 0.1 mPa·s to 100 mPa·s can be used.

(Method of Forming Membrane)

A preferred method for producing the separation composite membrane according to the invention comprises, as described above, the step for arranging the porous layer having the micropores having the specific pore diameter, the step for preparing the solution of the resin constituting the separating layer, and the step for applying the solution to the porous layer.

The impregnation ratio ($\eta a$) can be adjusted and controlled also by a micropore diameter of the above-mentioned porous membrane, but can be also changed by adjusting conditions in the above-described application and drying step. For example, the viscosity is controlled by changing the concentration of the above-described resin solution, thereby allowing a change in the impregnation depth. Alternatively, a film thickness to be applied is changed, or environmental temperature during application, temperature, time or the like during drying is changed, thereby allowing setup to a desired impregnation depth.

[Method of Separating Gas Mixture]

The method of separating a gas mixture according to the present invention is a method of separating at least one acid gas from a mixed gas containing the at least one acid gas by gas separation membrane. The acid gas that can be separated by using the separation composite membrane or the gas separation composite membrane of the present invention is preferably carbon dioxide or hydrogen sulfide. Thus, the separation membrane according to the present invention includes a membrane for separating gas (gaseous matter), but may include a separation membrane for supercritical fluid or the like. Specific examples of target supercritical fluid include supercritical carbon dioxide.

In the method of separating gas using the separation membrane according to the present invention, a component of a gas mixture being a raw material is not particularly defined, but main components of the gas mixtures are preferably carbon dioxide and methane or carbon dioxide and hydrogen. The separating method exhibits particularly excellent performance under the coexistence of carbon dioxide and acid gas such as hydrogen sulfide as the gas mixture, and exhibits excellent performance preferably in separation of carbon dioxide and hydrocarbon such as methane, carbon dioxide and nitrogen, or carbon dioxide and hydrogen. Further, as mentioned above, the present invention exhibits a high effect in such a case of BTX being contained in the mixed gas to be separated, to maintain good gas separation properties, thereby allowing long life of the membrane.

Above all, a gas to be supplied is preferably a mixed gas of carbon dioxide and methane, as an example, a transmission rate of carbon dioxide at 40° C. and 8 atm (approximately 0.8 MPa) is preferably more than 5 GPU, more preferably from 5 to 500 GPU. A ratio of transmission rates ($P_{CO2}/P_{CH4}$) of carbon dioxide and methane is preferably 15 or more, more preferably 20 or more. To describe the pressure herein, the pressure can be widely applied from atmospheric pressure to 15 MPa in which gas separation is conducted, and specific examples include conditions of 3 MPa to 15 MPa in high-pressure treatment of a natural gas or the like. The present invention allows suitable conformance to such high-pressure treatment. A mixed gas to be supplied may contain water vapor or a trace amount of higher hydrocarbon.

[Separating Membrane Module and Gas Separation Apparatus]

The separation composite membrane of the present invention is preferably a composite membrane using a porous support in combination, and a gas separating membrane module using the same is more preferred. Moreover, an apparatus for gas separation having means for separating and recovering or separating and purifying gas can be obtained by using the separation composite membrane, the composite membrane, or the separating membrane module of the present invention.

The separation composite membrane of the present invention is preferably used in the form of a module. Examples of the module include spiral, hollow, pleat, tubular, and plate and frame type. Moreover, the polymer membrane of the present invention may be applied to an apparatus for separating and recovering gas using a membrane/absorption hybrid method in conjunction with an absorption solution, for example, as described in JP-A-2007-297605.

EXAMPLES

The present invention will be described in more detail based on the following examples, but the invention is not intended to be limited thereto.

(Example • Comparative Example)

To a 1 mass % tetrahydrofuran (THF) solution of Matrimid 5218 (trade name, manufactured by Ciba-Geigy AG), xylene-diamine (XDA) was added so as to be in a concentration of 1% by mass based on Matrimid, and the resultant mixture was stirred at 35° C. for 180 minutes. A polyacrylonitrile (PAN) porous membrane was prepared applying a wet process (phase separation process). A pore diameter was controlled by appropriately changing membrane-forming conditions (temperature, PAN solution viscosity (concentration), a kind of PAN solvent, an additive) or the like. The solution was applied onto porous PAN (a pore diameter was described in Table 1 below) at 30° C. by a bar coating process, and the resultant coat was dried at 70° C. for 2 hours, and taken as a composite membrane sample 101. In addition thereto, a material or the like was changed as in Table 1 below, and each of composite membrane samples 101 to 104, C11, C12 and C14 was prepared. In order to adjust $\eta a$, when necessary, a concentration of a solution of Matrimid 5218, an application temperature thereof, a drying temperature thereof and a drying time thereof were controlled.

Further, a sample C13 represents an example in which the sample was made by hydrophilizing PAN by corona discharge treatment.

C15 represents an example in which no xylenediamine (XDA) was added, and no cross-linking was applied in the above-described formulation.

The Galwick liquid was used as a measuring liquid, pressure was gradually increased by air at room temperature, and a bubble point was measured.

Loss Modulus ($\epsilon''$)

A loss modulus was measured by a DMA unit (DMS 6100, manufactured by Seiko Instruments Inc.). Specifically, a

TABLE 1

| | Separating layer | | Porous layer | | | | |
|---|---|---|---|---|---|---|---|
| No. | Material | Thickness [μM] | Material | Thickness [μM] | Maximum pore diameter [μM] | Water contact angle [°] | Cross-linking |
| 101 | M5218 | 0.5 | PAN | 30 | 0.07 | 40 | Presence |
| 102 | ↑ | ↑ | ↑ | ↑ | 0.4 | 40 | Presence |
| 103 | ↑ | ↑ | ↑ | ↑ | 0.1 | 40 | Presence |
| 104 | ↑ | ↑ | ↑ | ↑ | 0.2 | 40 | Presence |
| C11 | M5218 | 0.5 | PAN | 30 | 0.03 | 40 | Presence |
| C12 | ↑ | ↑ | ↑ | ↑ | 0.07 | 40 | Presence |
| C13 | ↑ | ↑ | ↑ | ↑ | 0.07 | <10 | Presence |
| C14 | ↑ | ↑ | ↑ | ↑ | 0.7 | 40 | Presence |
| C15 | ↑ | ↑ | ↑ | ↑ | 0.07 | 40 | Absence |

| | | | | | | Performance evaluation | |
|---|---|---|---|---|---|---|---|
| | | | | | | First-stage of use | |
| No. | ηa [%] | ηb [%] | ηc [%] | $\epsilon''$ | Adhesion | (Fr) | After 100 hr |
| 101 | 7 | 0.1 | 0.1 | A | A | A | A |
| 102 | 15 | 0.3 | 0.3 | A | A | A | A |
| 103 | 10 | 0.2 | 0.2 | A | A | A | A |
| 104 | 10 | 0.2 | 0.2 | A | A | A | A |
| C11 | 7 | 0.1 | 0.1 | A | B | B | — |
| C12 | 0 | 0 | 0 | A | B | A | — |
| C13 | 35 | 0.6 | 0.6 | A | A | B | B |
| C14 | 12 | 0.2 | 0.2 | A | A | B | B |
| C15 | 7 | 0.1 | 0.1 | B | A | A | B |

M5218: Matrimid

<Evaluation Condition>

Impregnation Amount Ratio

A thickness of a membrane formed on a porous base material was read from an image by cross-sectional SEM (when an interface was unclear, a thickness of the porous base material alone was subtracted from a total layer thickness), and taken as a non-impregnated membrane thickness. Moreover, a thickness of a part into which pores of the porous base material were buried was taken as an impregnated membrane thickness. Calculation was made therefrom according to the formula below, and a calculated value was taken as an impregnation amount ratio [ηa].

Impregnated membrane thickness ($s$)/non-impregnated membrane thickness ($t_1$)=impregnation amount ratio [ηa].

When an impregnated portion was hard to specify, a specific element in a membrane raw material was mapped by EDX mapping, and a measured value was taken as the impregnation amount ratio. In addition, a numeric value in Table is a mean value of measured values on 50 places.

Maximum Pore Diameter of Porous Support

A maximum pore diameter (bubble point) was measured by a bubble point process. As a measuring instrument, Perm-Porometer manufactured by PMI was used (in accordance with JIS K3832). Specifically, a porous membrane cut out to a size of 3 cm×3 cm was immersed into a surfactant solution (Galwick liquid). The membrane was removed therefrom and an excess surfactant solution was lightly wiped off, and then the porous membrane was interposed between two sheets of metallic meshes, and set to a measuring cell of the instrument.

strip-shaped sample (5 mm×22 mm) of a separation membrane was made, and set to a device for evaluation. The sample was set to the unit and a loss modulus $\epsilon''$ was measured under the above-described conditions. A loss modulus at 130° C. at a heating rate of 5° C./min, and a frequency of 1 Hz was adopted. Then, $\epsilon''$ was evaluated to be A for 100 or more, B for 1 or more and less than 100, and C for less than 1.

Adhesion Between Support and Separating Layer

A cross-cut tape peeling test on a sample surface (application plane) was conducted. A cellophane tape ("CT 24", manufactured by NICHIBAN Co., Ltd.) was used and adhered onto a film with a ball of a finger, and then peeled off. Judgment was made as follows:

A: 10 pieces or less of squares that were not peeled off in 100 squares;

B: over 10 pieces of squares that were not peeled off in 100 squares.

(in accordance with JIS D 0202-1988).

Water Contact Angle

A water contact angle in a porous layer was measured by Automatic Contact Angle Meter DM 500 manufactured by Kyowa Interface Science Co., Ltd. Pure water was injected into a syringe, 0.4 μL was added dropwise, under ordinary temperature (23° C.), to a plane of a membrane constituting a porous layer on a side on which a separating layer was arranged, and then after 1 second from dropwise addition, a contact angle (°) was measured.

$CO_2/CH_4$ Gas Separation and Permeation Performance $CO_2$ transmittance, $CH_4$ transmittance and $CO_2/CH_4$ selectivity were measured by Isobar Gas Permeation Testing System manufactured by GTR Tec Corporation. Measurement was carried out under conditions of feed gas ($CO_2$=300 sccm, CH$_4$=300 sccm), feed-side pressure (800 kPaG [about 7.8 MPa]), a sweep gas (Ar=100 sccm), sweep-side pressure (0 kPaG), and a temperature of 40° C. Judgment was made based on the following criteria:

Fr: Performance in first-stage of use
- A: Transmission rate of CO$_2$ was 50 GPU or more, and (transmission rate of CO$_2$)/(transmission rate of CH$_4$) was 25 or more.
- B: Transmission rate of CO$_2$ was 50 GPU or more, and (transmission rate of CO$_2$)/(transmission rate of CH$_4$) was less than 25.
- C: Transmission rate of CO$_2$ was less than 50 GPU, and (transmission rate of CO$_2$)/(transmission rate of CH$_4$) was 25 or more.
- D: Transmission rate of CO$_2$ was less than 50 GPU, and (transmission rate of CO$_2$)/(transmission rate of CH$_4$) was less than 25.

After 100 hr: change ratio after 100-hour use based on a first-stage value Fr.
- A: A decrease ratio was 30% or less in both transmittance and selectivity.
- B: A decrease ratio was 30% or less in either transmittance or selectivity.
- C: A decrease ratio was over 30% in both transmittance and selectivity.

As described in the above-described results, the separation composite membrane according to the present invention is found to allow exhibition of a high effect in separation of fluid components under high pressure to realize good separation characteristics (Fr) in the first-stage of use, and not only an improvement in high pressure resistance, but also extension of a service life of the membrane per se when the membrane is used under high pressure for a long period of time.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Gas separating layer
1a Impregnated portion
2 Supporting layer (Porous layer)
3 Nonwoven fabric layer
10, 20 Separation composite membrane

The invention claimed is:

1. A separation composite membrane comprising:
a separating layer for separating fluid components, the separating layer being constituted of polyimide resin having a cross-linked structure, and
a porous layer for supporting the separating layer, the porous layer having a maximum pore diameter of 0.05 to 0.5 μm, and the porous layer being constituted of at least a resin selected from the group consisting of a polyacrylonitrile resin, a polysulfone resin, a cellulose resin, a fluorocarbon resin, a polyether sulfone resin, a polyamide resin and a polyolefin resin,
the separating layer being partly impregnated into the porous layer in the range of 5 to 30% in terms of the impregnation amount ratio (ηa) defined by Formula (A):

[impregnation amount ratio (η$a$){%}=impregnation depth ($s$)/(membrane thickness ($t_1$) of separating layer)×100]   (A).

2. The separation composite membrane according to claim 1, wherein the separating layer is defined in a polymer membrane having a cross-linked structure with a loss modulus in the range of 1 to 1,000 MPa.

3. The separation composite membrane according to claim 1, wherein a water contact angle on a surface of the porous layer on a side of the separating layer is 35 degrees or more.

4. The separation composite membrane according to claim 1, wherein an impregnation amount ratio (ηb) determined from the impregnation depth ($s$) and a membrane thickness ($t_2$) of the porous layer according to Formula (B) is in the range of 0.01 to 20%:

[impregnation amount ratio (η$b$){%}=impregnation depth ($s$)/(membrane thickness ($t_2$) of the porous layer)×100]   (B).

5. The separation composite membrane according to claim 1, wherein an impregnation amount ratio (ηc) determined from the impregnation depth ($s$) and a total thickness (D) of the separating layer and the porous layer according to Formula (C) is in the range of 0.01 to 20%:

[impregnation amount ratio (η$c$){%}=impregnation depth ($s$)/(total thickness ($D$) of the separating layer and the porous layer)×100]   (C).

6. A separating membrane module, having the separation composite membrane according to claim 1.

7. A fluid separation system, comprising the separating module according to claim 6.

* * * * *